(12) United States Patent
Hayashi

(10) Patent No.: US 7,250,967 B2
(45) Date of Patent: Jul. 31, 2007

(54) APPARATUS FOR MODIFYING REPRODUCTION FREQUENCY BAND OF VIDEO SIGNAL

(75) Inventor: Kenkichi Hayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 683 days.

(21) Appl. No.: 10/402,936

(22) Filed: Apr. 1, 2003

(65) Prior Publication Data
US 2005/0074224 A1 Apr. 7, 2005

(30) Foreign Application Priority Data
Apr. 11, 2002 (JP) .............................. 2002-108667

(51) Int. Cl.
*H04N 9/68* (2006.01)
*H04N 5/217* (2006.01)

(52) U.S. Cl. ...................................... 348/234; 348/241

(58) Field of Classification Search ................ 348/234, 348/235, 236, 237, 238, 280
See application file for complete search history.

(56) References Cited

U.S. PATENT DOCUMENTS

| | | | | |
|---|---|---|---|---|
| 4,131,913 A | * | 12/1978 | Yamanaka et al. | 348/276 |
| 4,415,923 A | * | 11/1983 | Noda | 348/675 |
| 5,493,412 A | * | 2/1996 | Koyama et al. | 386/29 |
| 5,848,181 A | * | 12/1998 | Ogata | 382/169 |
| 6,816,193 B1 | * | 11/2004 | Kohashi et al. | 348/234 |

* cited by examiner

*Primary Examiner*—Ngoc-Yen Vu
*Assistant Examiner*—Nicholas G Giles
(74) *Attorney, Agent, or Firm*—McGinn IP Law Group, PLLC

(57) ABSTRACT

False signals and noise are reduced in a device such as a digital still camera having a solid-state electronic image sensing device. To achieve this, a luminance signal generating circuit generates luminance signals Y1 and Y3 having different reproduction frequency bands. The larger the sum Cd of the absolute values of color difference signals Cr and Cb, the greater the proportion of R- and B-color components in the image of a subject. Accordingly, the luminance signals Y1 and Y3 are combined in such a manner that a reproduction frequency band based upon the R- and B-color components will dominate.

16 Claims, 6 Drawing Sheets

APPARATUS FOR MODIFYING REPRODUCTION FREQUENCY BAND OF VIDEO SIGNAL

BACKGROUND OF THE INVENTION

1. Field of the Invention

This invention relates to an apparatus for modifying the reproduction frequency band of a video signal.

2. Description of the Related Art

In a single-chip color CCD, color filters having characteristics that transmit an R, G or B color component are formed on photodiodes. The color filters are arrayed differently for each of the colors R, B and G. As a consequence, the reproduction frequency band of the R, G or B color signal output from the single-chip color CCD differs from one color signal to another. For example, the reproduction frequency band of the G color signal is broader than the reproduction frequency band of the R and B color signals.

In order to raise image resolution, it will suffice to widen the reproduction frequency band. However, the reproduction frequency band is decided on a per-color-signal basis. If the reproduction frequency band is always widened beyond the decided reproduction frequency band, false signals are produced and image quality declines. Though band limiting processing may be executed on a per-color-signal basis in order to eliminate false signals, such processing cannot be executed with an optical LPF (low-pass filter).

Further, the amount of noise increases in proportion to the reproduction frequency band. If the reproduction frequency band is widened in order to improve resolution, therefore, image quality declines, even in the case of a monochrome video signal. For these reasons, modifying the reproduction frequency band has not been considered viable heretofore.

SUMMARY OF THE INVENTION

Accordingly, an object of the present invention is to modify the reproduction frequency band of a video signal.

According to the present invention, the foregoing object is attained by providing an apparatus for modifying the reproduction frequency band of a video signal, comprising an input device for inputting a video signal that is output from a solid-state electronic image sensing device, a reproduction frequency band modifying device for modifying the reproduction frequency band of the input video signal in accordance with a given modifying condition, and an output device for outputting the resultant signal.

In accordance with the present invention, a video signal output from a solid-state electronic image sensing device is input to an apparatus for modifying the reproduction frequency band. A modifying condition is applied to the apparatus, which proceeds to modify the reproduction frequency band of the input video signal in accordance with the modifying condition.

Thus, the reproduction frequency band of an input video signal is modified in accordance with a given modifying condition. This makes it possible to modify reproduction frequency band at any time, such as in a case where the image quality of an image represented by a video signal will not deteriorate even though the reproduction frequency band is modified. It is also possible to adopt an arrangement in which a modification in reproduction frequency band is now allowed, as in instances where image quality will decline.

By way of example, the solid-state electronic image sensing device is obtained by forming color filters on optoelectronic transducers and is of the single-chip type for outputting a color video signal. In this case, the apparatus further comprises a color signal generator (color signal generating means) for generating a plurality of color signals (inclusive of a plurality of luminance signals) from a color video signal that is output from the solid-state electronic image sensing device. The reproduction frequency band of each of the plurality of color signals generated by the color signal generator is modified. The apparatus would further comprise a combining device (combining means) for combining and outputting a plurality of color signals, the color reproduction frequency bands of each of which have been modified, in accordance with a ratio of colors contained in a color image represented by the color video signal output from the solid-state electronic image sensing device.

The degree to which the plurality of color signals are combined changes depending upon the ratio of the colors. As a result, a combined video signal having an optimum color reproduction frequency band that conforms to the ratio of the colors is obtained.

Preferably, the input video signal is output upon modifying the reproduction frequency band thereof in dependence upon amount of noise contained in the video signal output from the solid-state electronic image sensing device, number of pixels constituting the solid-state electronic image sensing device or whether or not the input video signal has undergone downsampling processing.

Noise can be suppressed by modifying the reproduction frequency band so as to narrow the same. If the number of pixels increases, it becomes difficult to identify high-frequency components. Accordingly, eliminating false signals and noise by modifying the reproduction frequency band so as to narrow the same is considered more effective. Furthermore, though aliasing distortion occurs when downsampling processing is executed, the occurrence of aliasing distortion can be prevented by modifying the reproduction frequency band so as to narrow the same. Of course, it goes without saying that the reproduction frequency band can be modified so as to widen the same.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

Figure 1:
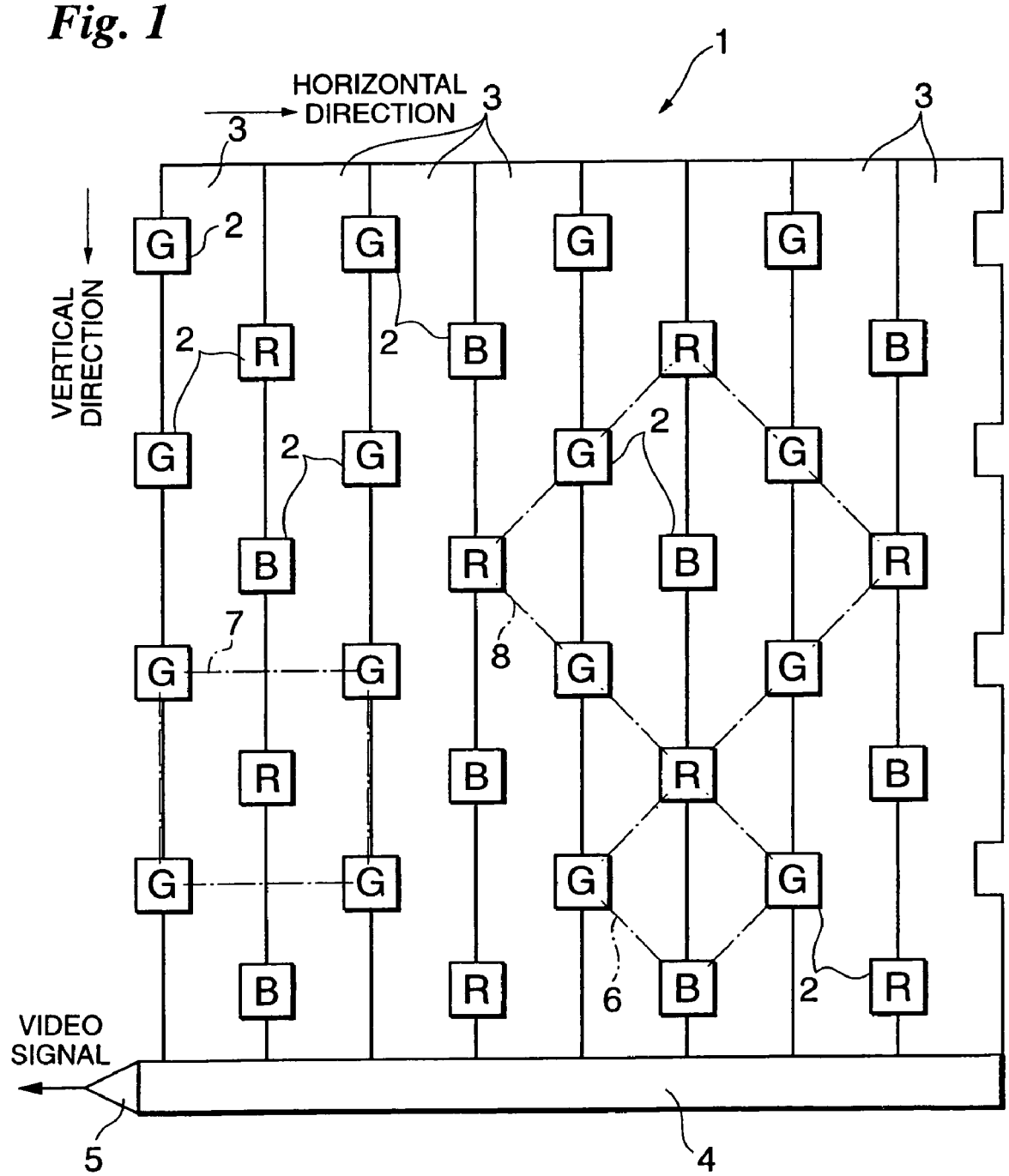
FIG. 1 is a diagram illustrating part of the structure on the photoreceptor surface of a CCD.

FIG. 1, which illustrates an embodiment of the present invention, shows part of the structure on the photoreceptor surface of a CCD 1.

The CCD 1 includes a number of photodiodes 2 arrayed in the horizontal (row) and vertical (column) directions. The photodiodes 2 in odd-numbered columns are arrayed in odd-numbered rows and those in even-numbered columns are arrayed in even-numbered rows. (This is a so-called honeycomb array.) Of course, an arrangement may be adopted in which the photodiodes 2 in odd-numbered columns are arrayed in even-numbered rows and those in even-numbered columns are arrayed in odd-numbered rows.

An R-color filter having a characteristic that transmits a red color light component, a B-color filter having a characteristic that transmits a blue color light component or a G-color filter having a characteristic that transmits a green color light component is formed on the photoreceptor surface of each the photodiodes 2. The character "R" is assigned to photodiodes 2 on which the R-color filters are formed, the character "B" is assigned to photodiodes 2 on which the B-color filters are formed, and the character "G" is assigned to photodiodes 2 on which the G-color filters are formed. The G-color filters are formed on the photodiodes 2 in odd-numbered columns, and the R- and B-color filters are formed alternately on the photodiodes 2 in even-numbered columns. Though each photodiode 2 is illustrated as being rectangular in shape when viewed from the plane, it goes without saying that the photodiodes may be hexagonal or any other suitable shape.

If four mutually adjacent photodiodes are extracted from all of the photodiodes 2, a diamond-shaped configuration 6 is obtained. Further, if four mutually adjacent photodiodes are extracted from the photodiodes 2 on which the G-color filters have been formed, a rectangular-shaped configuration 7 is obtained. Further, if four mutually adjacent photodiodes are extracted from the photodiodes 2 on which the R- or B-color filters have been formed, a diamond-shaped configuration 8 is obtained that is larger than the diamond-shaped configuration 6 obtained by extracting four mutually adjacent photodiodes from all of the photodiodes 2. Owing to this arrangement, the reproduction frequency band is modified, as will be described below.

A vertical transfer line 3 is formed on the right side (or on the left side) of each column of the photodiodes 2. By applying transfer pulses to the vertical transfer lines 3, signal charge that has accumulated in the photodiodes 2 is transferred in the vertical direction.

A horizontal transfer line 4 for transferring signal charge in the horizontal direction (from right to left) in accordance with an applied horizontal transfer pulse is provided at the lowermost edge of the CCD 1. When signal charge that has been transferred through the vertical transfer lines 3 is applied to the horizontal transfer line 4, the signal charge is transferred in the horizontal direction and is output externally via an amplifier circuit 5 as a video signal.

Figure 2:
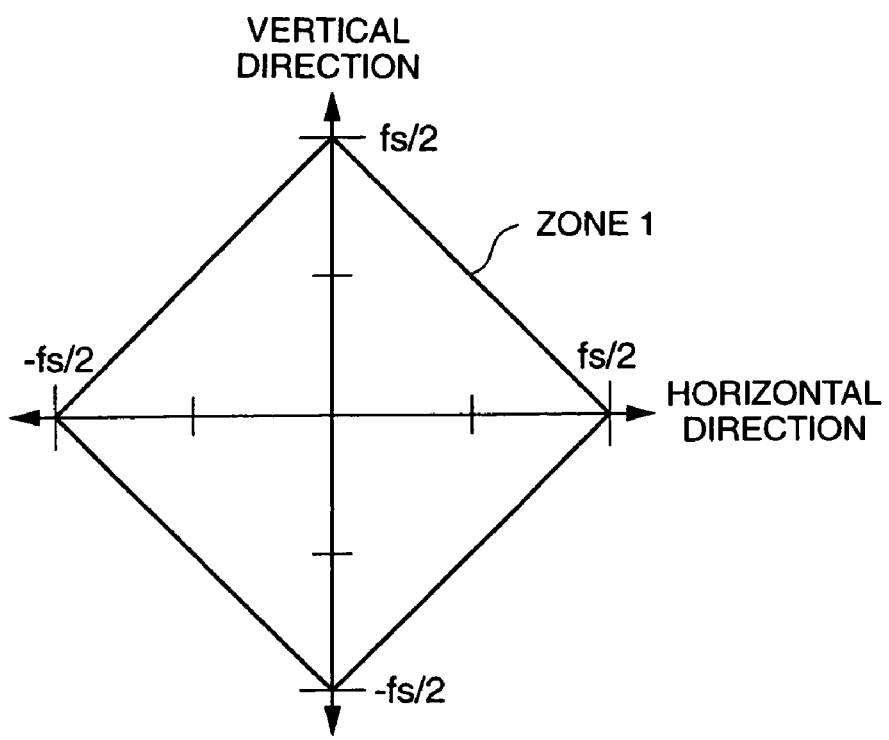
FIGS. 2 to 5 are diagrams illustrating reproduction frequency bands.
Figure 3:
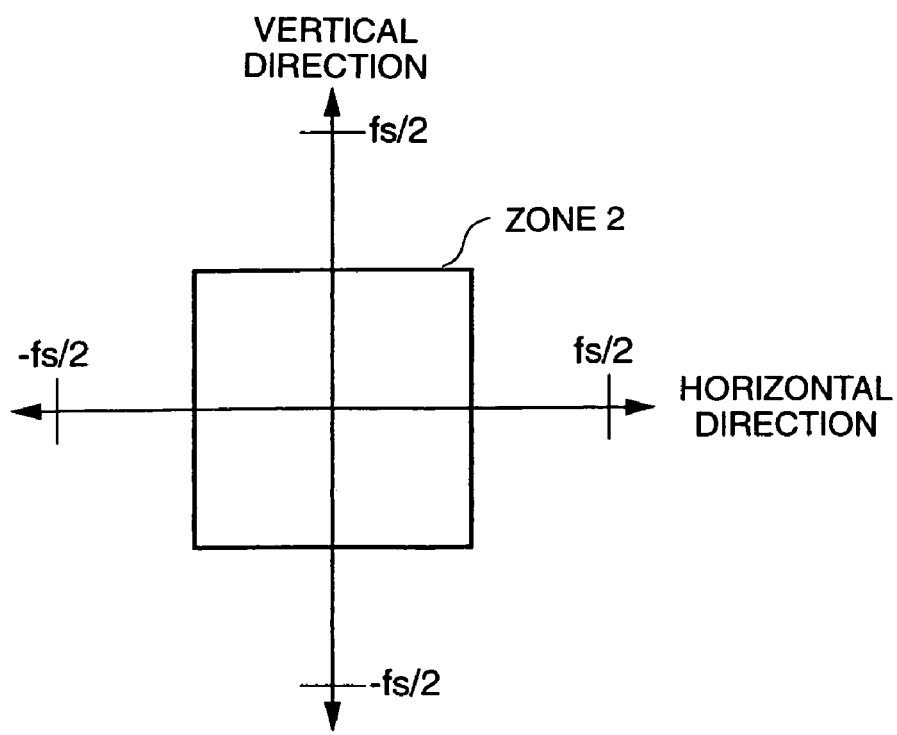
Figure 4:
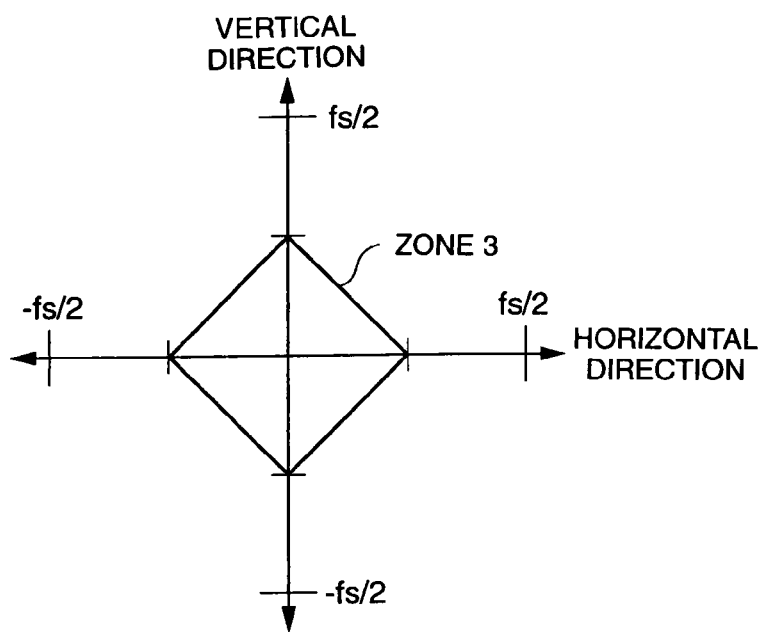

FIGS. 2 to 4 illustrate the reproduction frequency bands of video signals.

FIG. 2 illustrates the reproduction frequency band of a video signal that is output from the CCD 1 when a subject of color gray is imaged using the CCD 1 shown in FIG. 1.

In this case where the color of subject is gray, a video signal obtained based upon signal charge that has accumulated in all of the photodiodes 2 can be used in order to reproduce an image representing the gray subject. A reproduction frequency band (zone 1), therefore, corresponds to an array of photodiodes 2 of the CCD 1. This is the diamond-shaped configuration (the diamond-shaped configuration 6 described above.) The reproduction frequency band is the result of connecting the points of one-half the spatial frequency fs (fs/2=Nyquist frequency fn) and the points of one-half the negative spatial frequency, i.e., −fs/2.

FIG. 3 illustrates the reproduction frequency band of a video signal, which has been obtained based upon signal charge that has accumulated in the photodiodes 2 on which the G-color filters have been formed, in a video signal obtained when a subject is imaged using the CCD 1 shown in FIG. 1.

A reproduction frequency band (zone 2), which is obtained based upon signal charge that has accumulated in photodiodes 2 on which the G-color filters have been formed, corresponds to an array of photodiodes 2 on which the G-color filters have been formed. The reproduction frequency band is rectangular in shape (which corresponds to the rectangular configuration 7 described above). This reproduction frequency band is the result of connecting the points of frequencies that are half the Nyquist frequency into a rectangle.

FIG. 4 illustrates the reproduction frequency band of a video signal, which has been obtained based upon signal charge that has accumulated in the photodiodes 2 on which the B or R-color filters have been formed, in a video signal obtained when a subject is imaged using the CCD 1 shown in FIG. 1.

A reproduction frequency band (zone 3), which is obtained based upon signal charge that has accumulated in photodiodes 2 on which the B or R-color filters have been formed, corresponds to an array of photodiodes 2 on which the B or R-color filters have been formed. The reproduction frequency band is diamond-shaped (which corresponds to the diamond-shaped configuration 8 described above). This reproduction frequency band is the result of connecting the points of frequencies that are half the Nyquist frequency fn into a diamond shape.

Figure 5:
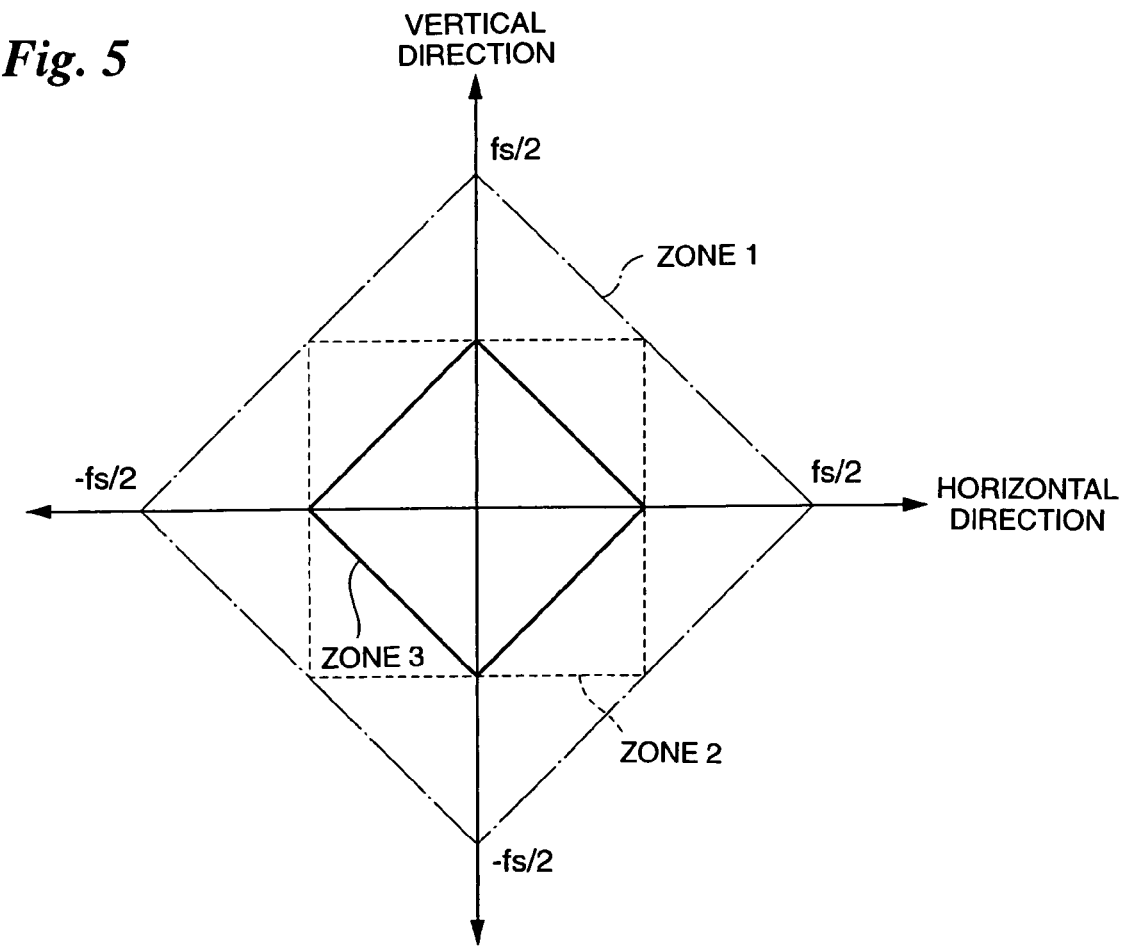

FIG. 5 illustrates the reproduction frequency bands of FIGS. 2 to 4 in superimposed form.

As will be understood from FIG. 5, the reproduction frequency band (zone 1) of the video signal output from the CCD 1 of FIG. 1 when the gray-colored subject is imaged using the CCD 1 has the largest reproduction frequency band. The next largest reproduction frequency band is the reproduction frequency band (zone 2) of the video signal obtained based upon then signal charge that has accumulated in the photodiodes 2 on which the G-color filters have been formed. The last reproduction frequency band is the reproduction frequency band (zone 3) of the video signal obtained based upon then signal charge that has accumulated in the photodiodes 2 on which the B or R-color filters have been formed.

Figure 6:
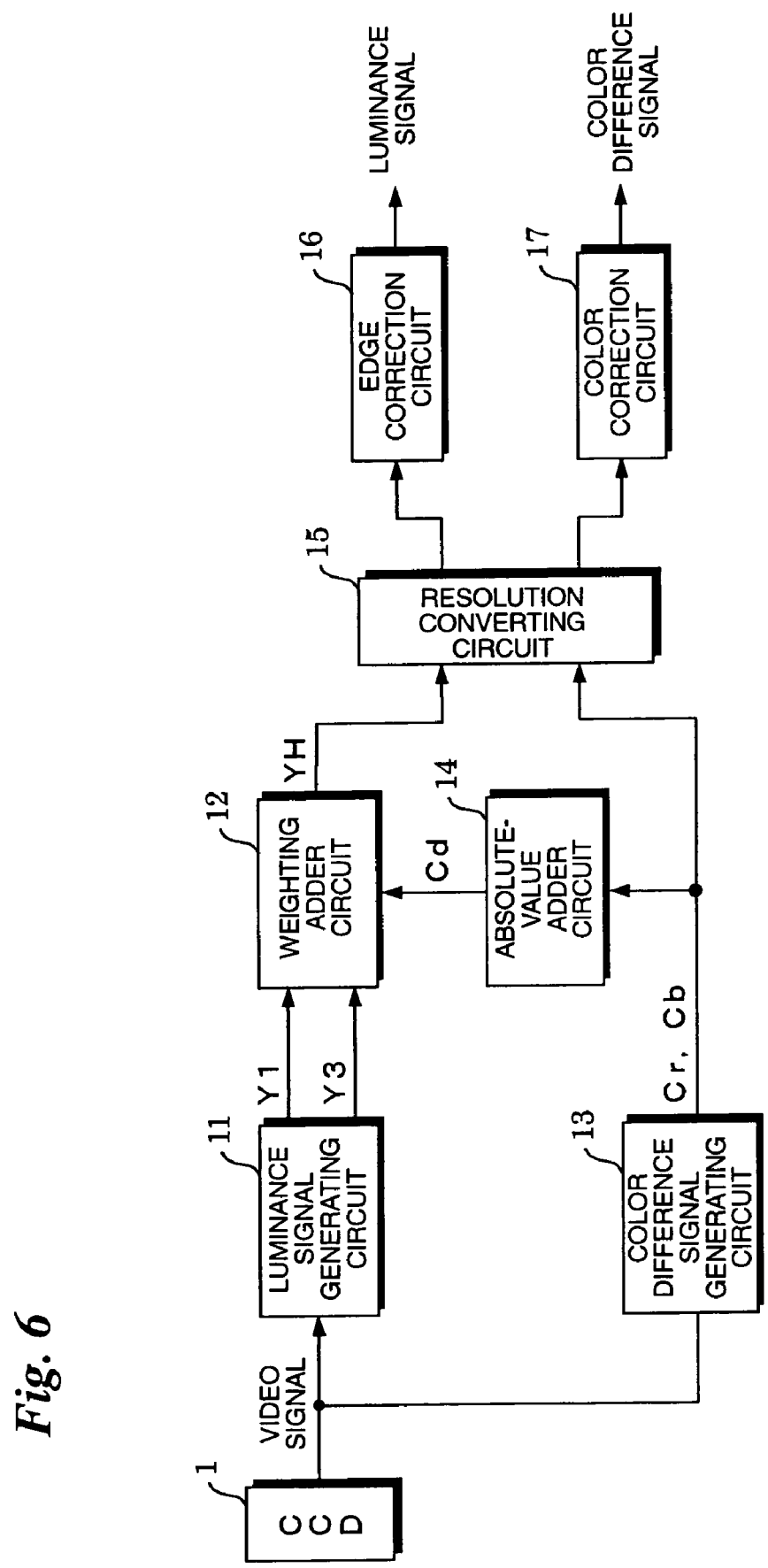
FIG. 6 is a block diagram illustrating part of the electrical structure of a digital still camera.

FIG. 6 is a block diagram illustrating part of the electrical structure of a digital still camera.

A solid-state electronic image sensing device is used as the CCD 1 shown in FIG. 1. If a subject is imaged by the CCD 1, a video signal representing the image of the subject is output by the CCD 1. The video signal is input to a luminance signal generating circuit 11 and a color difference signal generating circuit 13.

The luminance signal generating circuit 11 generates two luminance signals Y1 and Y3 from the input video signal. The luminance signal Y1 has the reproduction frequency band of zone 1 shown in FIG. 2, and the luminance signal Y3 has the reproduction frequency band of zone 3 shown in FIG. 4. The luminance signal Y1 having the reproduction frequency band of zone 1 and the luminance signal Y3 having the reproduction frequency band of zone 3 can be generated using two filters having the reproduction frequency band characteristic of zone 1 and the reproduction frequency band characteristic of zone 3, respectively. Of course, an arrangement may be adopted in which these are generated using a single filter capable of being switched between the reproduction frequency band characteristic of zone 1 and the reproduction frequency band characteristic of zone 3. The luminance signals Y1 and Y3 generated are input to a weighting adder circuit 12.

On the basis of the magnitude of a weighting signal (modifying condition) Cd applied in a manner described later, the weighting adder circuit 12 changes the ratio of the luminance signals Y1 and Y3, generates a weighted luminance signal YH and outputs this signal.

The color difference signal generating circuit 13 generates color difference signals of Cr and Cb from the input video signal. The generated color difference signals Cr and Cb are input to an absolute-value adder circuit 14 and a resolution converting circuit 15.

The absolute-value adder circuit 14 adds the absolute values |Cr| and |Cb| of the respective color difference signals and produces the weighting signal Cd. Specifically, the weighting signal Cd is generated in accordance with Equation (1) below. The weighting signal Cd indicates the quantity of red and blue components contained in the video signal that is output from the CCD 1.

$$Cd=|Cr|+|Cb| \qquad \text{Eq. (1)}$$

The weighting adder circuit 12 generates the weighted luminance signal YH in accordance with Equation (2) in accordance with the value of the weighting signal Cd output from the absolute-value adder circuit 14.

$$YH=[Cd \times Y3+(Th-Cd) \times Y1]/Th \qquad \text{Eq. (2)}$$

where Th represents a threshold value.

Figure 7:
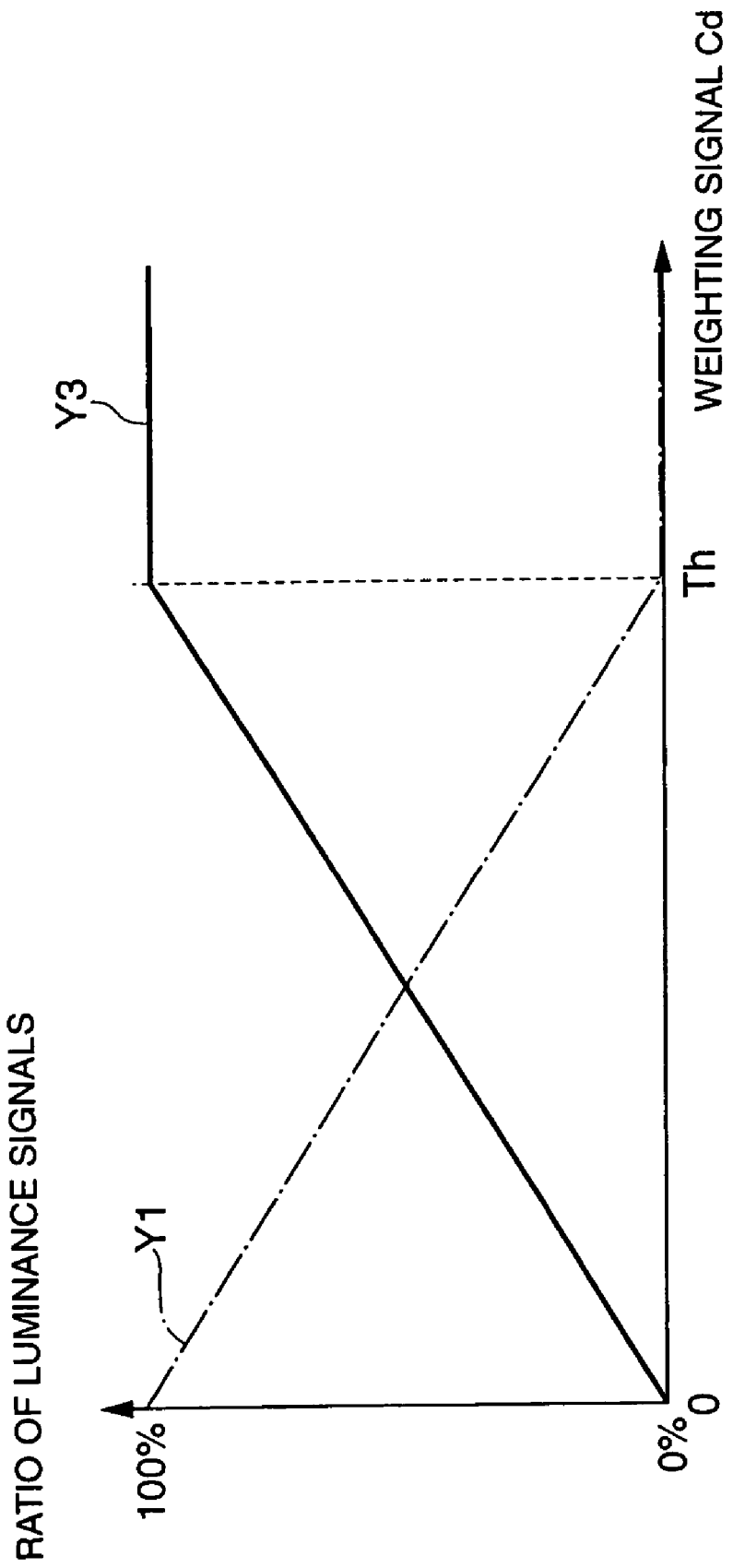
FIG. 7 is a diagram illustrating a weighting signal and ratio at which luminance signals are combined.

FIG. 7 is a diagram illustrating the relationship between the value of the weighting signal Cd and the luminance signals Y1 and Y3.

When the weighting signal Cd is zero, the percentage of the luminance signal Y1 is 100% and that of the luminance signal Y3 is 0. As the weighting signal Cd gradually increases from zero, the percentage of the luminance signal Y1 decreases and the percentage of the luminance signal Y3 increases. When the weighting signal Cd exceeds the threshold value Th, the percentage of the luminance signal Y1 becomes 0 and that of the luminance signal Y3 becomes 100%. The weighting adder circuit 12 generates the weighted luminance signal YH having this ratio between the luminance signals Y1 and Y3. The luminance signal YH thus generated is input to the resolution converting circuit 15 shown in FIG. 6.

The resolution converting circuit 15 converts the resolution (number of pixels) of the image represented by the luminance signal YH and color difference signals Cr and Cb. Resolution is decided in accordance with a mode set by a mode switch (not shown).

The luminance signal output from the resolution converting circuit 15 is input to an edge correction circuit 16, and the color difference signals are input to a color correction circuit 17.

The edge correction circuit 16 applies edge correction processing to the image represented by the applied luminance signal. Further, the color correction circuit 17 applies color correction processing to the image represented by the applied color difference signals.

The captured image is displayed by applying the luminance signal output from the edge correction circuit 16 and the color difference signals output from the color correction circuit 17 to a display unit.

The greater the quantity of red and blue components contained in the video signal output from the CCD 1, the greater the percentage of the luminance signal Y3 for which the reproduction frequency band corresponding to the red and blue components is dominant, as shown in FIG. 4. Since a luminance signal having a reproduction characteristic conforming to the color of the subject is obtained, the occurrence of false signals and noise, etc., can be prevented and an image having a high resolution is obtained.

The above-described embodiment uses the CCD 1, which outputs a color video signal as shown in FIG. 1. However, an embodiment of the present invention can also use a CCD that outputs a monochrome video signal.

Figure 8:
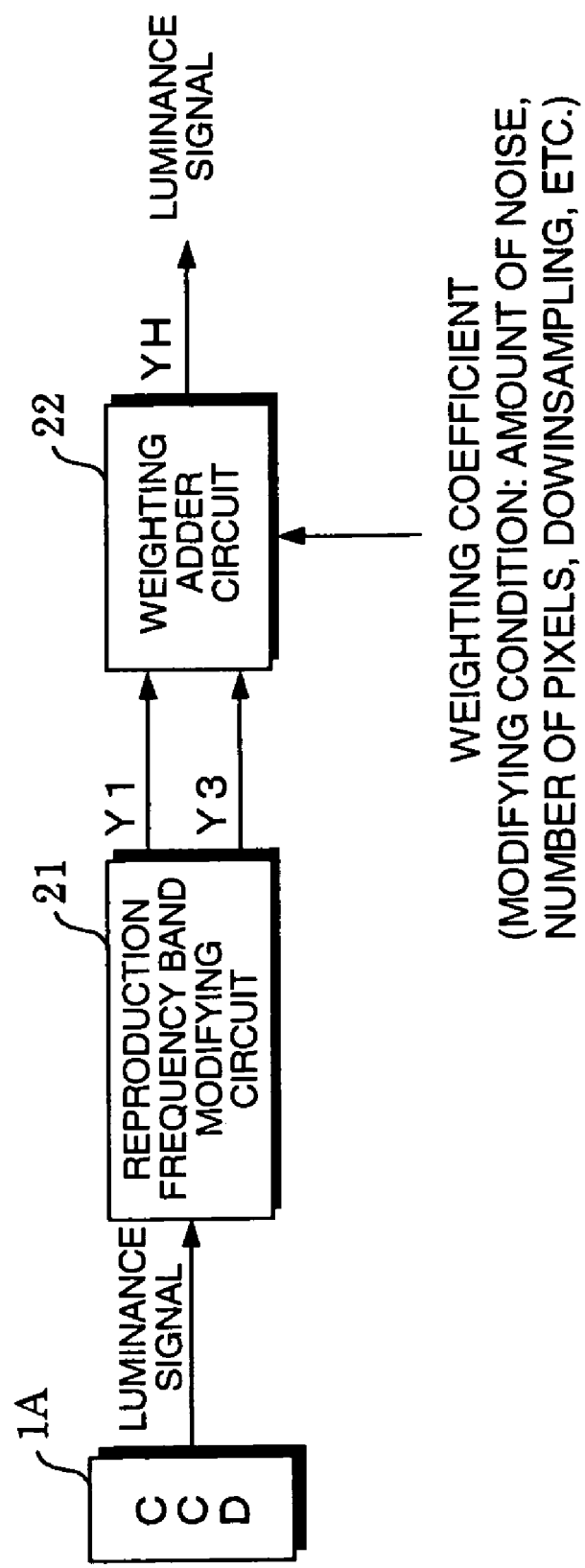
FIG. 8 is a block diagram illustrating part of the electrical structure of a digital still camera according to another embodiment.

FIG. 8 is a block diagram illustrating part of the electrical structure of a digital still camera that uses a CCD 1A for monochrome video.

The CCD 1A outputs a luminance signal, which is input to a reproduction frequency band modifying circuit 21.

The reproduction frequency band modifying circuit 21 includes a filter having the reproduction frequency band characteristic of zone 1 and a filter having the reproduction frequency band characteristic of zone 3 in a manner similar to that of the weighting adder circuit 12. The reproduction frequency band modifying circuit 21 generates the above-described luminance signals Y1 and Y3.

The generated luminance signals Y1 and Y3 are input to a weighting adder circuit 22.

In accordance with a given weighting coefficient, the weighting adder circuit 22 changes the ratio of input luminances Y1 and Y3 and outputs the weighted luminance signal YH.

In this embodiment, examples of weighting coefficients are the amount of noise contained in the luminance signal output from the CCD 1A, the number of pixels constituting the CCD 1A, etc. If the video signal output from the CCD 1A is downsampled, a downsampling rate may be included among the coefficients.

Since the amount of noise increases in proportion to the reproduction frequency band, it is so arranged that the reproduction frequency band is narrowed in case of an image containing a large amount of noise or when noise reduction takes precedence. More specifically, it is so arranged that the percentage of the luminance signal Y3 is made greater than the percentage of the luminance signal Y1.

If the number of pixels is large, high-frequency components of an image can no longer be identified and therefore the necessity for high-frequency components declines. When the number of pixels is large, therefore, it is so arranged that the reproduction frequency band is narrowed. As a result, it is possible to eliminate false signals and noise.

Furthermore, when downsampling processing is executed, it is so arranged that the reproduction frequency band is narrowed in order to prevent false signals ascribable to aliasing distortion caused by downsampling. For example, in case of a downsampling rate for downsampling at ½ (an area ratio of ¼), it is so arranged that the luminance signal Y3 is used.

In the above-described embodiments, luminance signals having the reproduction frequency bands of zones 1 and 3 are combined. However, it is permissible to adopt an arrangement in which a luminance signal having the reproduction frequency band of zone 2 is generated and this is combined.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for modifying a reproduction frequency band of a video signal comprising:
   a reproduction frequency band modifying device for generating a first luminance signal and a second luminance signal, and a reproduction frequency band of the first luminance signal is different from a reproduction frequency of the second luminance signal, based upon a luminance signal that is output from a solid-state electronic image sensing device; and
   an adder device for adding the first luminance signal generated by the reproduction frequency band modifying device to the second luminance signal generated by the reproduction frequency band modifying device in accordance with a weighting coefficient, wherein the weighting coefficient comprises an amount of noise contained in the luminance signal.

2. The apparatus according to claim 1, wherein the solid-state electronic image sensing device comprises a signal-chip solid-state electronic image sensing device that include optoelectronic transducers and color filters formed on said transducers and outputs a color video signal, said apparatus further comprising:
   a color signal generator for generating a plurality of color signals from the color video signal that is output from the solid-state electronic image sensing device, reproduction frequency bands of respective ones of these plurality of color signals generated by said color signal generator being modified; and
   a combining device for combining and outputting the plurality of color signals, the color reproduction frequency bands of respective ones of which have been modified, in accordance with a ratio of colors contained in a color image represented by the color video signal output from the solid-state electronic image sensing device.

3. The apparatus according to claim 1, wherein the first luminance signal comprises a reproduction frequency band that corresponds to a signal charge accumulated in an array of photodiodes.

4. The apparatus according to claim 3, wherein the second luminance signal comprises a reproduction frequency band that corresponds to a signal charge accumulated in the array of photodiodes on which filters are formed.

5. The apparatus according to claim 1, wherein the reproduction frequency of the first luminance signal is larger than the reproduction frequency of the second luminance signal.

6. The apparatus according to claim 1, wherein the first luminance signal and the second luminance signal are generated using filters having different reproduction frequency band characteristics.

7. The apparatus according to claim 1, wherein the adder device changes a ratio of the first luminance signal and the second luminance signal, and generates a weighted luminance signal.

8. The apparatus according to claim 1, wherein the generated luminance signals have reproduction characteristics conforming to a color of a subject.

9. The apparatus according to claim 1, wherein the weighting coefficient comprises a number of pixels constituting a CCD.

10. An apparatus for modifying a reproduction frequency band of a video signal, comprising:
    means for modifying a reproduction frequency band;
    means for generating a first luminance signal and a second luminance signal; and
    means for adding the first luminance signal to the second luminance signal in accordance With a weighting coefficient, wherein the reproduction frequency band of the first luminance signal is different from a reproduction frequency of the second luminance signal, based upon a luminance signal that is output from a solid-state electronic image sensing means, wherein the weighting coefficient comprises an amount of noise contained in the luminance signal.

11. The apparatus according to claim 10, wherein the solid-state electronic image sensing means comprises a single-chip solid-state electronic image sensing device that includes optoelectronic transducers and color filters formed on said transducers and outputs a color video signal, said apparatus further comprising:
    means for generating a plurality of color signals from the color video signal that is output from the solid-state electronic image sensing means, reproduction frequency bands of respective ones of these plurality of color signals generated by said means for generating a plurality of color signals being modified; and
    means for combining and outputting the plurality of color signals, the color reproduction frequency bands of respective ones of which have been modified, in accordance with a ratio of colors contained in a color image represented by the color video signal output from the solid-state electronic image sensing means.

12. The apparatus according to claim 10, wherein the first luminance signal comprises a reproduction frequency band that corresponds to a signal charge accumulated in an array of photodiodes.

13. The apparatus according to claim 12, wherein the second luminance signal comprises a reproduction frequency band that corresponds to a signal charge accumulated in the array of photodiodes on which filters are formed.

14. The apparatus according to claim 10, wherein the reproduction frequency of the first luminance signal is larger than the reproduction frequency of the second luminance signal.

15. The apparatus according to claim 10, wherein the first luminance signal and the second luminance signal are generated using filters having different reproduction frequency band characteristics.

16. The apparatus according to claim 10, wherein the means for combining and outputting the plurality of color signals changes a ratio of the first luminance signal and the second luminance signal, and generates a weighted luminance signal.

* * * * *